Patented Feb. 14, 1928.

1,658,807

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

PROCESS OF MAKING ZIRCONIUM COMPOUNDS.

No Drawing. Application filed May 27, 1926. Serial No. 112,178.

My invention relates primarily to obtaining zirconium compounds from zirconium ores or minerals such as baddeleyite or from zircon (zirconium silicate). For most present uses such zirconium ores have to be altered and preferably be made to yield their silicon separate from the zirconium. In the preparation of the zirconium oxide used in white vitreous enamels as well as in textile industries, it is desirable to remove the silicon and also such impurities as the iron, titanium, etc. Heretofore processes have been used which depended upon fusion with molten alkalis followed by extraction with water to remove the silicon and leaving the zirconium insoluble in water. To make a good separation by such methods a relatively large amount of alkali is required and to effect a clean separation of the silicon and zirconium at least two fusions would be required.

The removal of silicon usually depends upon forming a water-soluble silicate and then separating same from the water insoluble zirconium residue. In such cases the iron and titanium etc. remain with the zirconium and require additional treatment of such zirconium residue for their removal.

The objects of my invention are, among other things, the provision of novel and simplified methods for deriving zirconium oxide and zirconium compounds from natural zircon or baddeleyite (containing both zirconium oxide and zirconium silicate) by bringing both zirconium and silicon into acid solution and then precipitating or crystallizing the zirconium out, while leaving the silicon in solution along with the iron, titanium etc.: in short having obtained an acid solution containing both zirconium and silicon in solution, the zirconium can be precipitated and separated from the silicon which, upon filtration, remains in solution along with the impurities mentioned. Any suitable method may be resorted to for decomposing the zirconium ores or minerals whereby the otherwise insoluble zirconium silica minerals become soluble in dilute acids, for example, that disclosed in my pending application for patent filed October 27th, 1925, Serial Number 65,243, by which the zirconium silicate in a finely-milled state is mixed with a restricted amount of alkali, sodium carbonate for example, yielding a charge which is then heated at relatively low temperatures. The mass does not shrink materially and retains to a large extent its dry character; the zircon is decomposed so as to form a zirconium compound readily dissolving in dilute acids with the silicon carried into the solution along with the zirconium.

My invention may be successfully practiced as follows:—I first mill the zirconium ore or zircon (zirconium silicate) preferably as fine as 325 mesh and usually by the wet process and then mix same with about 1.10 parts by weight of potassium hydroxide (KOH) to one part of zircon. The charge is thereafter heated at about 950° C. for about three hours. It will be found that practically no shrinkage of the mass has occurred and that the zircon has to all practical purposes been completely decomposed without any appreciable liberation of zirconium oxide, and leaving both the zirconium and silicon in a form readily soluble in dilute acids. For example, I have found dilute $H_2SO_4$ or oxalic acid are excellent solvents.

Assuming that it is desired to obtain a double potassium zirconium sulphate, I then proceed as follows:—The heated or roasted charge is preferably disintegrated with an approximately equal weight of water to break down any clots so as to form a fine slurry containing the zirconium in solid compounds and also the silicon to a large degree in solid compound. To this slurry is added an amount of sulphuric acid ($H_2SO_4$) sufficient to combine with the potassium hydroxide (KOH) and the zirconia ($ZrO_2$) in the zircon, in each case calculating the acid required to form a normal sulphate. This acid is diluted so as to contain 0.90 grams $H_2SO_4$ per c. c. with considerable latitude in mixing the slurry and acid. For example, if the slurry is sufficiently diluted concentrated sulphuric acid (sp. gr. 1.83) may be added. The chief considerations to observe are to avoid too great a concentration of zirconium and silicon in solution and too high a temperature for protracted periods, since both high concentration and elevated temperatures are conducive to the separation of the silicon which is the aim of my present invention to prevent.

I have found advantageous the following adjustment of the Zr. Si slurry to contain the following equivalents:

| | Grams. |
|---|---|
| ZrO$_2$ per liter | 80 |
| SiO$_2$ per liter | 40 |
| KOH per liter | 132 |

These figures represent only equivalents since such compounds do not, of course, exist as I have designated owing to their having been combined during the roasting step which I have described. Heating this slurry to about 50° C., adding the H$_2$SO$_4$ (0.90 gms. per c. c.), not allowing the temperature to rise much above 70° C., and upon the solution of the zirconium and silicon and alkaline compounds, I have discovered that upon proper cooling a double sulphate of potassium and zirconium will precipitate and may readily be separated from the silicon compounds which remain in solution. I have also discovered that the iron, titanium and other impurities to a large extent pass along with the silicon into the acid solution. Hence my improved method in a single step purifies the zirconium from discoloring impurities as well as separating the zirconium from the silicon compounds. I have also found that the amount of potassium above indicated is not essential as regards the precipitation of zirconium from the acid solution.

Furthermore I have also discovered by using approximately equal parts of Na$_2$CO$_3$ and KOH as the alkaline reactive agent to decompose the zircon that, upon treating such mass to the solution of the zirconium and silicon as I have hereinbefore described, the precipitation of zirconium and its separation from the silicon compounds in the solution will be as effective as when the alkaline reagent was entirely supplied as KOH.

Again I have also discovered that the use of KOH may be entirely eliminated as the alkaline reactive agent when using sodium carbonate to decompose the zircon as disclosed in my aforesaid pending application Serial No. 65,243. For upon dissolving the mass in sulphuric acid, the potassium may be supplied in the form of the relatively cheap potassium chloride (KCl). I find that it makes little or no difference whether the KCl is added to the zirconium silicon slurry before adding the acid, or whether it is added during or after the addition of the acid. For each part of ZrO$_2$ (equivalent) present, one part by weight of KCl is found to be sufficient. The detailed requirements of concentration, temperature etc. are substantially the same as I have hereinbefore described.

In allowing this solution to cool after dissolving, I have found that the separation of the zirconium takes place advantageously at about 47° C. under proper conditions of dilution etc. For example, if the KCl is added to the warm solution of zirconium and silicon in sulphate solution finishing off at about 55° C., by allowing this solution to cool, preferably while stirring, I have discovered that at about 47° C. rapid separation of zirconium occurs and the batch can be filtered or the solids separated before the temperature falls below 40° C.

By any of these three methods which I have hereinbefore described, products have been obtained representing from 75% to 95% recovery of the zirconium and from 80 to 95% elimination of the silicon; the iron and titanium present are reduced to the extent of leaving about 20% present in the zircon treated. For example, if the zircon used contained 1.50% TiO$_2$ and 0.20% Fe$_2$O$_3$, a zirconium oxide derived from the potassium zirconium sulphate salt would contain only 0.30% TiO$_2$ and 0.06% Fe$_2$O$_3$ while the SiO$_2$ in such derived zirconium oxide may vary from say 3% to 18%.

I have also found that if in some cases part of the acid be neutralized with Na$_2$CO$_3$, a higher yield of zirconium can be obtained; care must be observed however because if too much Na$_2$CO$_3$ be added, the yield will be even lower than if none were added. For instance in case where normally a 75% recovery of the zirconium would result from precipitation as described, the neutralization of say 15 to 25% of the total amount of H$_2$SO$_4$ added, followed by cooling etc., a 90% or higher recovery of zirconium would result, whereas if say 35-40% of the acid were neutralized the yield would be less than 75%.

The following is an analysis of the potassium-zirconium sulphate salt obtained when dried at 110° C.:—

| | Per cent. |
|---|---|
| Silica (SiO$_2$) | 4.56 |
| Zirconia (ZrO$_2$) | 36.64 |
| Potassium (K$_2$O) | 15.62 |
| Sulphates (SO$_3$) | 36.78 |
| Water (H$_2$O) | 6.40 |

Zirconium oxide is derived from this double potassium zirconium salt by calcination with the formation of ZrO$_2$, K$_2$SO$_4$ with volatilization of SO$_3$, followed by extraction and washing with water to remove the K$_2$SO$_4$ etc.

This double potassium zirconium salt when dried at 110° C. can be further purified, if desired, by dissolving same in warm water, filtering out the small amount of silicon compounds present and having the filtrate treated to precipitate the zirconium so as to obtain additional removal of impurities. If a high grade of zircon is used, I have found that the separation as described is sufficient to produce a pure white zirconium oxide. Except for certain special cases the dried salt would require no further treatment other than calcination and extraction of $K_2SO_4$ etc.; if the silica is objectionable in such a case it could easily be removed, preferably by dissolving the salt in warm water and separating the silica by filtration, and then recovering the zirconium from solution.

The solution obtained from dissolving dried salt and filtering off silica can also be treated with sodium carbonate to slight alkalinity followed by heating to decompose any zirconium carbonate formed. The sulphates in this case pass into the solution and, upon filtration and washing, a residue is obtained which can be used for preparation of various pure zirconium salts by dissolving it in acids and later separating the desired compounds.

If instead of using the high grade or chemically refined zircon, the zircon used as raw material be one containing several per cent of $TiO_2$, $Fe_2O_3$ rare earths etc., the retreatment of the initially precipitated salt would be very important.

I claim as my invention:

1. The method of treating a silicious zirconium ore which comprises heating said ore mixed with an alkali to its substantial decomposition, treating the residue with acid to obtain both zirconium and silicon in acid solution, causing the zirconium compounds to precipitate from said solution while leaving the silicon therein, and removing the silicon-containing solution from the precipitated zirconium.

2. The method of treating a silicious zirconium ore which comprises heating said ore mixed with an alkali to its substantial decomposition, treating the residue with sulphuric acid to obtain both zirconium and silicon in acid solution adding a potassium compound to precipitate the zirconium compounds from said solution while leaving the silicon therein, and removing the silicon-containing solution from the precipitated zirconium.

3. The method of treating a silicious zirconium ore which comprises heating said ore mixed with an alkali to its substantial decomposition, treating the residue with sulphuric acid to obtain both zirconium and silicon in acid solution adding potassium chloride to said solution, precipitating the zirconium in the presence of the potassium compound while leaving the silicon therein, and removing the silicon-containing solution from the precipitated zirconium.

4. The method of treating a silicious zirconium ore which comprises heating said ore mixed with an alkali to its substantial decomposition, treating the residue with sulphuric acid to obtain both zirconium and silicon in acid solution, cooling the solution to precipitate the zirconium compounds therefrom in the presence of silicon while leaving the silicon therein, and removing the silicon-containing solution from the precipitated zirconium compounds.

5. The method of treating a silicious zirconium ore which comprises heating said ore mixed with an alkali to its substantial decomposition, treating the residue with sulphuric acid to obtain both zirconium and silicon in acid solution, adding potassium chloride to said solution, cooling the solution to precipitate the zirconium compounds therefrom while leaving the silicon therein, and removing the silicon-containing solution from the precipitated zirconium compounds.

6. The method of treating a silicious zirconium ore which comprises heating said ore mixed with an alkali to its substantial decomposition, treating the residue with sulphuric acid to obtain both zirconium and silicon in acid solution, cooling the solution between 70° and 40° C. to precipitate the zirconium compounds therefrom while leaving the silicon therein, and removing the silicon-containing solution from the precipitated zirconium compounds.

7. The method of treating a silicious zirconium ore which comprises heating said ore mixed with an alkali to its substantial decomposition, treating the residue with sulphuric acid to obtain both zirconium and silicon in acid solution, cooling the solution to about 47° C. to precipitate the zirconium compounds therefrom while leaving the silicon therein, and removing the silicon-containing solution from the precipitated zirconium compounds.

8. The method of treating a silicious zirconium ore which comprises heating said ore mixed with an alkali to its substantial decomposition, treating the residue with sulphuric acid to obtain both zirconium and silicon in acid solution, adding potassium chloride to said solution, cooling the solution between 70° and 40° C. to precipitate the zirconium compounds therefrom while leaving the silicon therein, and removing the silicon-containing solution from the precipitated zirconium compounds.

9. The method of treating a silicious zirconium ore which comprises heating said ore mixed with an alkali to its substantial decomposition, treating the residue with sulphuric acid to obtain both zirconium and silicon in acid solution, adding postassium chloride to said solution, cooling the solution to about 47° C. to precipitate the zirconium compounds therefrom while leaving the silicon therein, and removing the silicon-containing solution from the precipitated zirconium compounds.

10. The method of treating a silicious zirconium ore which comprises heating said ore mixed with an alkali to its substantial decomposition, treating the residue with acid to bring the zirconium and silicon and other impurities in acid solution, adding a potassium compound to precipitate the zirconium compounds from said solution while leaving the silicon and other impurities in solution and removing the substances in solution from the precipitated zirconium.

11. The method of treating a silicious zirconium ore which comprises heating said ore mixed with an alkali to its substantial decomposition, treating the residue with sulphuric acid to bring the zirconium and silicon and other impurities in sulphuric acid solution, adding a potassium compound to precipitate the zirconium compounds from said solution while leaving the silicon and other impurities in solution and removing the substances in solution from the precipitated zirconium.

12. The method of treating a silicious zirconium ore which comprises heating said ore mixed with an alkali to its substantial decomposition, treating the residue with sulphuric acid to bring the zirconium and silicon and other impurities in sulphuric acid solution, adding potassium chloride to said solution, precipitating the zirconium in the presence of the potassium compound while leaving the silicon and other impurities in solution and removing the substances in solution from the precipitated zirconium.

13. The method of treating a silicious zirconium ore which comprises heating said ore mixed with an alkali to its substantial decomposition, treating the residue with acid to bring the zirconium and silicon and other impurities in acid solution and then purifying the zirconium compounds by adding a potassium compound in the presence of the silicon to precipitate the zirconium compounds while leaving the silicon and other soluble substances in solution.

14. The method of treating a silicious zirconium ore which comprises heating said ore mixed with an alkali to its substantial decomposition, treating the residue with acid to bring the zirconium and silicon and other impurities in acid solution and then purifying the zirconium compounds with precipitation of said zirconium compounds upon cooling the solution, while leaving the other soluble substances in solution.

15. The method of treating a silicious zirconium ore which comprises heating said ore mixed with an alkali to its substantial decomposition, treating the residue with acid to bring the zirconium and silicon and other impurities in acid solution and then purifying the zirconium compounds with precipitation of said zirconium compounds upon cooling the solution between 70° and 40° C., while leaving the other soluble substances in solution.

16. The method of treating a silicious zirconium ore which comprises heating said ore mixed with an alkali to its substantial decomposition, treating the residue with acid to bring the zirconium and silicon and other impurities in acid solution and then purifying the zirconium compounds with precipitation of said zirconium compounds upon cooling the solution to about 47° C., while leaving the other soluble substances in solution.

17. In the derivation of zirconium compounds from a solution containing both zirconium and silicon, the step which consists in adding a potassium compound thereto to precipitate the zirconium in the presence of silicon while leaving the silicon in solution.

18. In the derivation of zirconium compounds from a solution containing zirconium and silicon and other impurities, the step which consists in adding a potassium compound thereto to precipitate the zirconium in the presence of silicon while leaving the silicon and other impurities in solution.

19. In the derivation of zirconium compounds from a sulphuric acid solution containing both zirconium and silicon, the step which consists in adding a potassium compound thereto to precipitate the zirconium in the presence of silicon while leaving the silicon in solution.

20. In the derivation of zirconium compounds from a potassium-sulphuric acid solution containing both zirconium and silicon, the step which consists in adding a potassium compound thereto to precipitate the zirconium in the presence of silicon while leaving the silicon in solution.

21. In the derivation of zirconium compounds from a solution containing both zirconium and silicon, the step which consists in cooling the solution to between 70° and 40° C. whereby the zirconium is precipitated in the presence of silicon while leaving the silicon in solution.

22. In the derivation of zirconium compounds from a potassium-sulphuric acid solution containing both zirconium and silicon, the step which consists in cooling the solution to between 70° and 40° C. whereby the zirconium is precipitated in the presence of silicon while leaving the silicon in solution.

23. In the derivation of zirconium compounds from a potassium-sulphuric acid solution containing both zirconium and silicon, the step which consists in cooling the solution to about 47° C. whereby the zirconium is precipitated in the presence of silicon while leaving the silicon in solution.

24. In the derivation of zirconium compounds from a sulphuric acid solution containing both zirconium and silicon in solution, the steps which consist in partially neutralizing the sulphuric acid in the said solution and then cooling the latter to between 70° and 40° C. whereby the zirconium is precipitated in the presence of silicon while leaving the silicon and other soluble substances in solution.

25. In the derivation of zirconium compounds from a sulphuric acid solution containing both zirconium and silicon in solution, the steps which consist in partially neutralizing the sulphuric acid in the said solution and then cooling the latter to about 47° C. whereby the zirconium is precipitated in the presence of silicon while leaving the silicon and other soluble substances in solution.

CHARLES J. KINZIE.